(12) United States Patent
Hung et al.

(10) Patent No.: US 8,094,131 B2
(45) Date of Patent: Jan. 10, 2012

(54) TOUCH CONTROL VIRTUAL SCREEN APPARATUS

(75) Inventors: Yi-Ping Hung, Taipei (TW); Li-Wei Chan, Taipei (TW)

(73) Assignee: National Taiwan University, Taipei (TW)

( * ) Notice: Subject to any disclaimer, the term of this patent is extended or adjusted under 35 U.S.C. 154(b) by 725 days.

(21) Appl. No.: 12/208,336

(22) Filed: Sep. 11, 2008

(65) Prior Publication Data

US 2009/0309842 A1 Dec. 17, 2009

(30) Foreign Application Priority Data

Jun. 11, 2008 (TW) ................................. 97121746 A

(51) Int. Cl.
*G06F 3/041* (2006.01)
(52) U.S. Cl. ...................... 345/173; 345/156; 178/18.01
(58) Field of Classification Search .................... 345/87, 345/156–173; 178/18.1
See application file for complete search history.

(56) References Cited

U.S. PATENT DOCUMENTS

| | | | | |
|---|---|---|---|---|
| 7,084,859 B1 * | 8/2006 | Pryor | ............................ | 345/173 |
| 2003/0137494 A1 * | 7/2003 | Tulbert | ........................ | 345/173 |
| 2005/0162381 A1 * | 7/2005 | Bell et al. | ...................... | 345/156 |
| 2009/0085881 A1 * | 4/2009 | Keam | ............................ | 345/173 |
| 2010/0103104 A1 * | 4/2010 | Son et al. | ...................... | 345/158 |

* cited by examiner

*Primary Examiner* — Amare Mengistu
*Assistant Examiner* — Premal Patel

(57) ABSTRACT

A touch control virtual screen apparatus is provided. The touch control virtual screen apparatus includes a screen, an optical structure, and a detection module. The screen is adapted for emitting light. The optical structure includes at least one optical lens, and is adapted for configuring an image of a virtual screen in a space corresponding to a screen image, in accordance with the optical imaging principle. The detection module is adapted for detecting whether a user touches the image of the virtual screen, and detecting a signal corresponding to a position of the virtual screen being touched, and converting the signal into the position and a related instruction corresponding to the position. In such a way, the user is allowed to operate digital content displayed on a virtual screen in a touch control manner, without directly touching the screen.

15 Claims, 6 Drawing Sheets

TOUCH CONTROL VIRTUAL SCREEN APPARATUS

BACKGROUND OF THE INVENTION

1. Field of the Invention

The present invention relates generally to a touch control virtual screen apparatus. The touch control virtual screen apparatus is adapted for displaying an image of a screen on a virtual screen provided in a space by an optical lens system. The appearance and disappearance of image displayed on the virtual screen can be controlled by the user. A detection module is employed for detecting whether the virtual screen is touched or not, and converting the signal into a corresponding position of the screen and a corresponding instruction thereof.

2. The Prior Arts

Currently, image displaying technologies are fast developed. Correspondingly, the image displaying technologies are then desired to be developed for more applications, for example, displaying images of a variety of sizes or higher image qualities. However, by all means, a substantive screen is always required for displaying images. Such a substantive screen occupies a certain space and spaces thereareound. The substantive screen may even leave the space behind the substantive screen useless. Recently, the development of liquid crystal display (LCD) and digital light processing (DLP) projection products has to some degree overcome the shortcoming of conventional cathode ray tube (CRT) displays (e.g., bulkiness and heaviness), and achieves lightness and better portability (e.g., notebook computer). The projection products are now even modified by directly or indirectly combining with a variety of digital products so as to achieve multi-function performance, and thus saving occupied space, and improving space utilization. However, no matter how space effective it could be, a conventional substantive screen more or less has to occupy a certain space in application, especially in an office environment which lacks spaces very much.

Typically, projection display screens including front-projection projectors, rear-projection screen flat planes, and rear-projection televisions, are display screens which occupy least spaces. However, a front-projection projector requires a substantive projection board or a projection flat plane, which will physically occupy a space in front of the user. Further, the space between the front-projection projector and the projection board must be unblocked. As to the rear-projection screen flat plane and the rear-projection television, although they are often disposed at a wall and do not occupy a desktop horizontal space, they inevitably occupy vertical wall space, whether they are in operation or not.

Recently, virtual screens which do not occupy substantive space have been proposed for research and development. Specifically, desktop virtual screen projection system has been put with much effort for development. The desktop virtual screen projection system is featured in disposing a projector at a ceiling or under a desk, which projects images onto the desk. When the desktop virtual screen projection system is not used for displaying, the desk is free for general purpose use.

There are many image displaying technologies concerning displaying images in a 3D space, or displaying an entire 3D image in space. For example, according to one conventional technology, vapor is generated to configure a projection interface, so as to allow projecting images thereon and displaying images in the space. According to another conventional technology, micro-particles are ejected out, and laser is projected on the ejected micro-particles so as to configure a simple pattern thereon. According to a further conventional technology, an entire 3D image can be produced in a 3D space for allowing many people viewing from different angles. In this case, an actuality system includes a very fast rotated thin film serving as a projection interface, and provides a laser synchronously projecting on the rotated thin film. When the thin film is rotated to different angles, corresponding contents are projected by the laser. In such a way, correct image contents can be viewed from any angle. However, all of the foregoing 3D image displaying technologies substantially occupy a substantive space or at least requires medium in a certain space. As such, such virtual screens for 3D image displaying are not suitable for office or family use.

Therefore, it is very desirable to provide a virtual screen for displaying a virtual screen image in a space adapted for daily life use. It is further desired that a horizontal substantive space or a vertical substantive space of such a virtual screen an also be effectively utilized.

SUMMARY OF THE INVENTION

A primary objective of the present invention is to provide a solution for the problem of substantive screens occupying substantive space, and to further provide a solution to the problem of the conventional technologies (i.e., requiring a clear desktop, occupying a substantive space, requiring a spatial medium) which are not suitable for office and family use.

For achieving the foregoing objective of the present invention, the present invention provides a touch control virtual screen apparatus. The touch control virtual screen apparatus includes a screen, an optical structure, and a detection module. The screen is adapted for emitting light. The optical structure includes at least one optical lens, and is adapted for configuring an image of a virtual screen in a space corresponding to a screen image, in accordance with the optical imaging principle. The detection module is adapted for detecting whether a user touches the image of the virtual screen, and detecting a signal corresponding to a position of the virtual screen being touched, and converting the signal into the position and a related instruction corresponding to the position. In such a way, the user is allowed to operate digital content displayed on a virtual screen in a touch control manner, without directly touching the screen.

The present invention provides a touch control virtual screen apparatus. According to embodiments of the present invention, the touch control virtual screen apparatus is adapted for displaying a virtual screen in a space a certain distance away. When the touch control virtual screen apparatus is not in use, the virtual screen disappears without occupying any substantive space. The user is allowed to touch control the content displaying on the virtual screen. For example, the screen, the optical structure, and the detection module can be assembled and hid beneath the desktop without occupying any desktop space. In operation, the image of the virtual screen of the screen is displayed in a space on the desktop. In this manner, the displayed virtual screen image can be conveniently displayed as desired.

According to embodiments of the present invention, the touch control virtual screen apparatus is adapted for arbitrarily setting an angle and a position for displaying the image of the virtual screen, for publicly displaying the image of the virtual screen. The touch control virtual screen apparatus is also adapted for clearly displaying the image of the virtual screen in a specific angle range and at a specific position only, while a personal at other positions or other angles can not view or cannot clearly view the image of the virtual screen. In this manner, the touch control virtual screen apparatus is adapted for avoiding from being peeked, and thus achieving better protection for privacy.

Furthermore, the touch control virtual screen of the touch control virtual screen apparatus is not substantive, and therefore when touch controlling the virtual screen, there is no real key being substantively touched, and thus it won't raise cross infection caused by substantively touching a same control key. In this manner, the touch control virtual screen apparatus is specifically suitable for public places, such as hospitals, entertainment places, clubs, shopping malls, for reducing the risks of contagious infection.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention, and are incorporated in and constitute a part of this specification. The drawings illustrate embodiments of the invention and, together with the description, serve to explain the principles of the invention.

The present invention provides a touch control virtual screen apparatus including a screen, an optical structure, and a detection module. According to the optical imaging principle, an image of the virtual screen can be displayed by the optical structure in a space corresponding to a screen image. The detection module is adapted to detect whether the virtual screen is touched by a user or not, so as to further allow the user to operate a digital content displayed on the virtual screen by directly touching the virtual screen.

Figure 1:
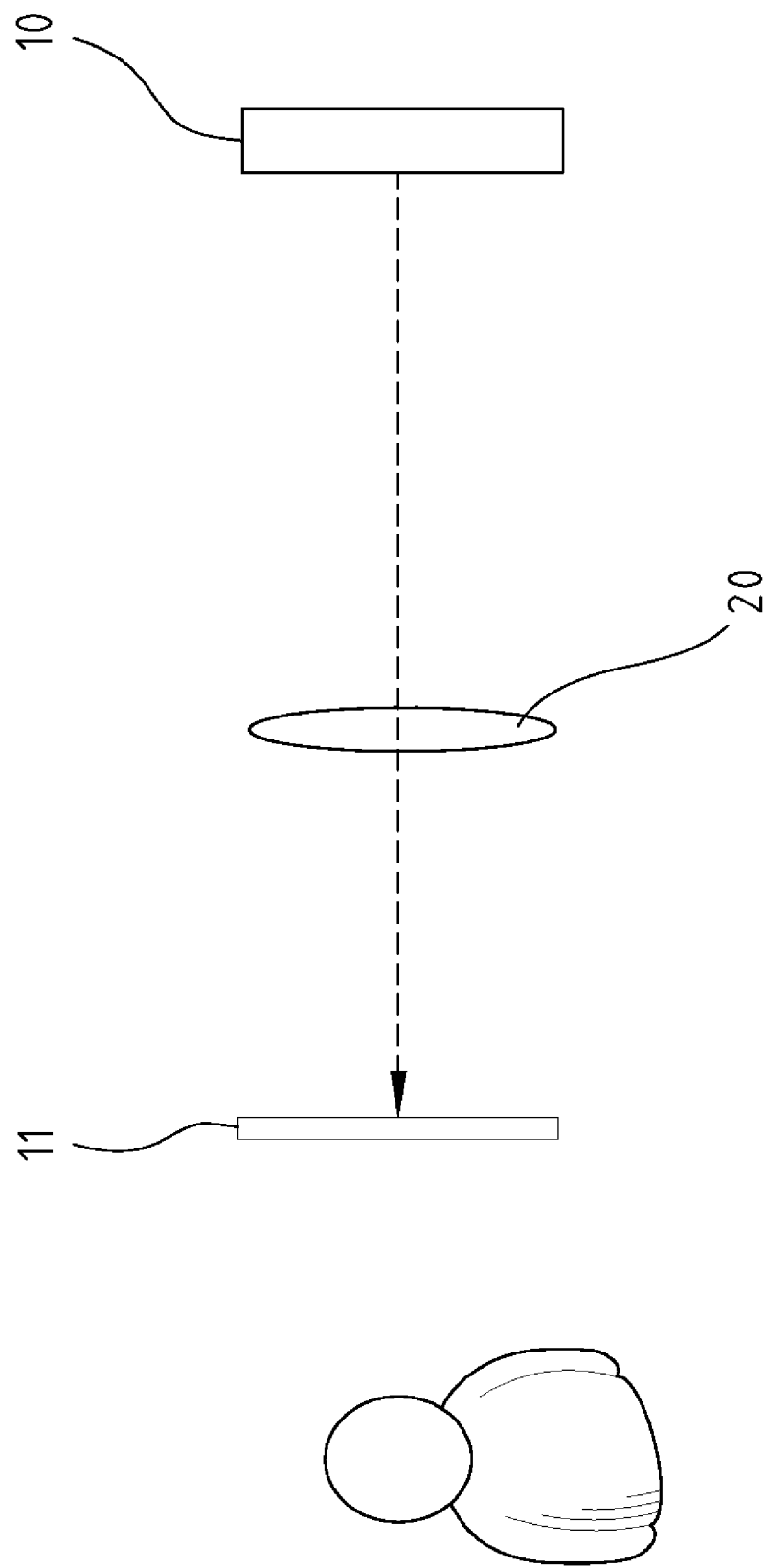
FIG. 1 is a first imaging embodiment illustrating a touch control virtual screen according to the present invention.

FIG. 1 is a first imaging embodiment illustrating a touch control virtual screen according to the present invention. Referring to FIG. 1, the touch control virtual screen includes a screen 10 and an optical structure 20, and is constructed in a manner of refraction. The optical structure 20 is at lest an optical lens. In a preferred embodiment, the optical structure 20 is a Fresnel lens. The optical structure 20 displays a virtual image of an image of the screen 10 at a virtual screen 11 in a 3D space. The imaging position of the virtual image displayed on the virtual screen 11 can be adjusted by adjusting an object distance (i.e., a distance from the optical structure 20 to the screen 10), or replacing an optical structure 20 of a lens having a different focal length. In accordance with the first imaging embodiment, a viewer is allowed to view the virtual image displayed on the virtual screen in the space by viewing from a correct angle only. When viewing from other angles, the viewer is incapable of viewing the virtual screen 11. As such, the embodiment is adapted to achieve a better information security.

Figure 2:
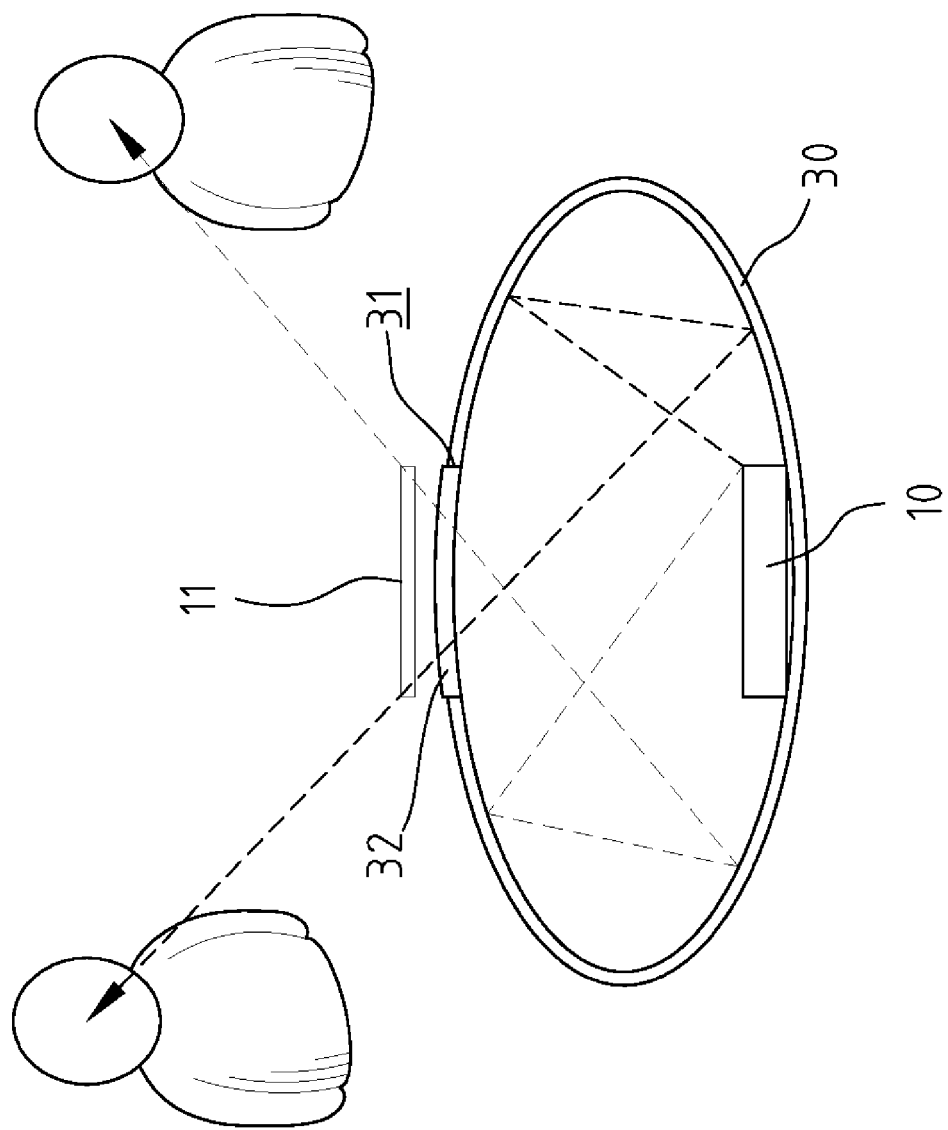
FIG. 2 is a second imaging embodiment illustrating a touch control virtual screen according to the present invention.

FIG. 2 is a second imaging embodiment illustrating a touch control virtual screen according to the present invention. Referring to FIG. 2, the touch control virtual screen includes a screen 10 and an optical structure 30, and is constructed in a manner of reflection. The optical structure 30 is substantially configured as a hollow ellipsoid. An inside surface of the hollow ellipsoid is a reflective surface. The screen 10 is accommodated inside the hollow ellipsoid. The hollow ellipsoid is configured with an opening 31, and is equipped with an optical lens 32 assembled to the opening 31 and corresponding to the screen 10. As shown in FIG. 2, after being reflected for two times at the inside reflective surface of the optical structure 30, the image of the screen 10 configures a real image of a virtual screen across the optical lens 32.

With respect to the second imaging embodiment, the viewer is absolutely free of restriction of viewing angles. In other words, a convergent real image of the virtual screen 11 can be viewed from any angle over the optical lens 32. As such, the second imaging embodiment of the present invention does not concern about the information security factor. On the contrary, the second imaging embodiment of the present invention is concerned more with totally and publicly displaying the virtual screen 11 in the space. This characteristic is more adapted for applications for public displaying purpose.

Figure 3:
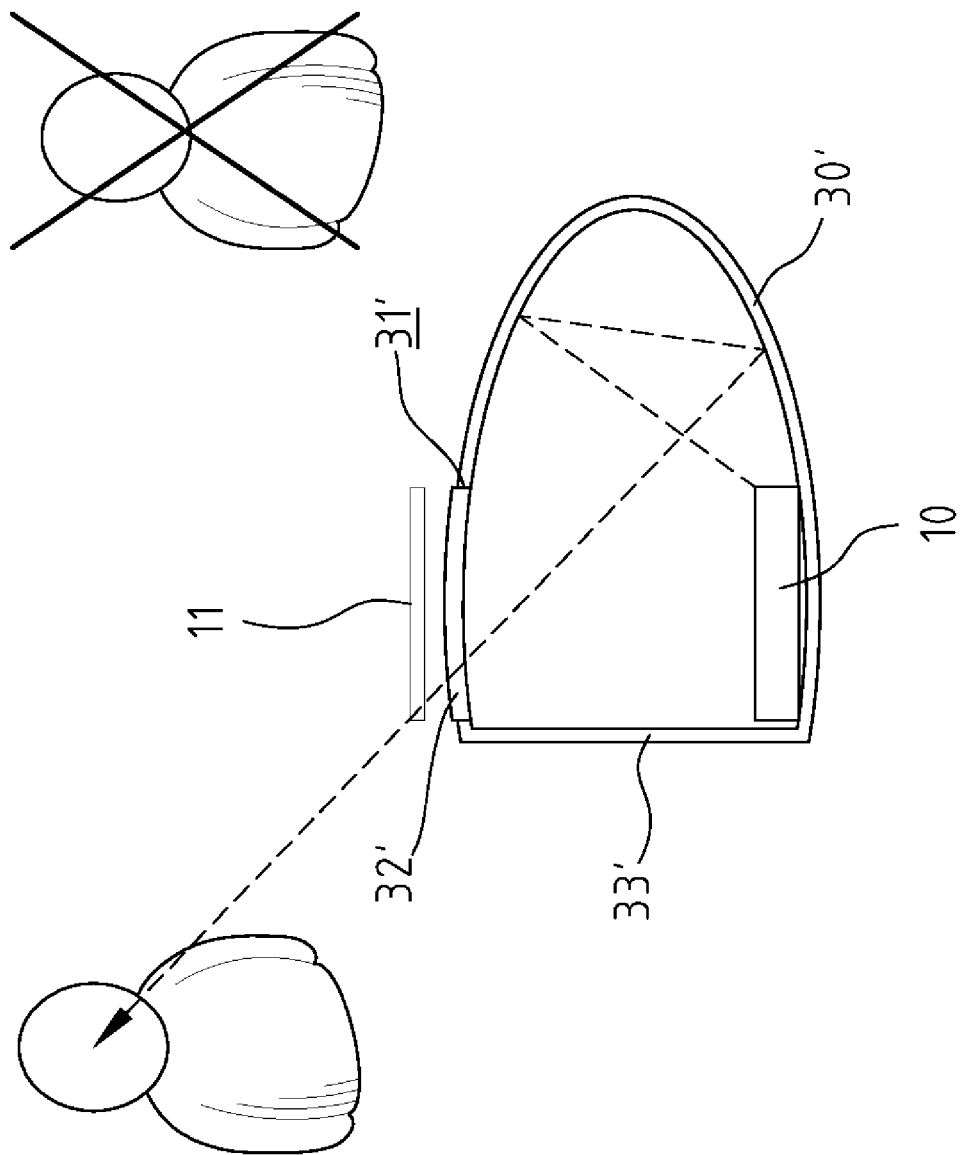
FIG. 3 is a third imaging embodiment illustrating a touch control virtual screen according to the present invention.

FIG. 3 is a third imaging embodiment illustrating a touch control virtual screen according to the present invention. Referring to FIG. 3, it shows a modification of the second imaging embodiment of FIG. 2. The touch control virtual screen includes a screen 10 and an optical structure 30', and is also constructed in a manner of reflection. Specifically, comparing with the optical structure 30 of FIG. 2, the optical structure 30' of the embodiment is substantially a hollow ellipsoid of the optical structure 30 having an end removed away from one side of the hollow ellipsoid. The removed end is patched with a flat plane 33'. An inside surface of the optical structure 30' is a reflective surface, while the flat plane 33' does not reflect the screen 10. The screen 10 is accommodated inside the hollow ellipsoid. The hollow ellipsoid is configured with an opening 31', and is equipped with an optical lens 32' assembled to the opening 31' and corresponding to the screen 10. As shown in FIG. 3, after being reflected for two times at the inside reflective surface of the optical structure 30', the image of the screen 10 configures a real image across the optical lens 32' serving as a virtual screen.

With respect to the third imaging embodiment, because the flat plane 33' of the optical structure 33 does not reflect the screen 10, the viewer is allowed to view the real image of the virtual screen 11 over the optical lens 32' from a viewing angle at the same side of the flat plane 33' only. In other words, viewers at the opposite side of the flat plane 33 cannot view the real image of the virtual screen 11. The modification of the optical structure 30', achieves better privacy protection by decreasing the reflection range. Further, in order to avoid reflection interference of the screen 10 inside the optical structure 30', an inside surface of the flat plane 33' is preferably configured with a non-light-reflective plane.

In accordance with the exemplifications of the second and the third imaging embodiments, it can be learnt that the application of the virtual screen in the reflection manner can be flexibly applied. It allows the user to modify the optical structure according to the purpose and place of using the touch control virtual screen, so as to satisfy different requirement for privacy protection.

Preferably, the screen 10 of the foregoing embodiments of FIGS. 1, 2, and 3, are LCD screens. However, other kinds of screens capable of emitting light can also be used.

As discussed above, the three imaging embodiments of the virtual screens of the present invention are constructed in manners of refraction and reflection, respectively. Further, the operation and application of the present invention can be practically complied by a user. Assisted by a detection module, the user can input instruction or operate the displayed virtual screen.

Figure 4:
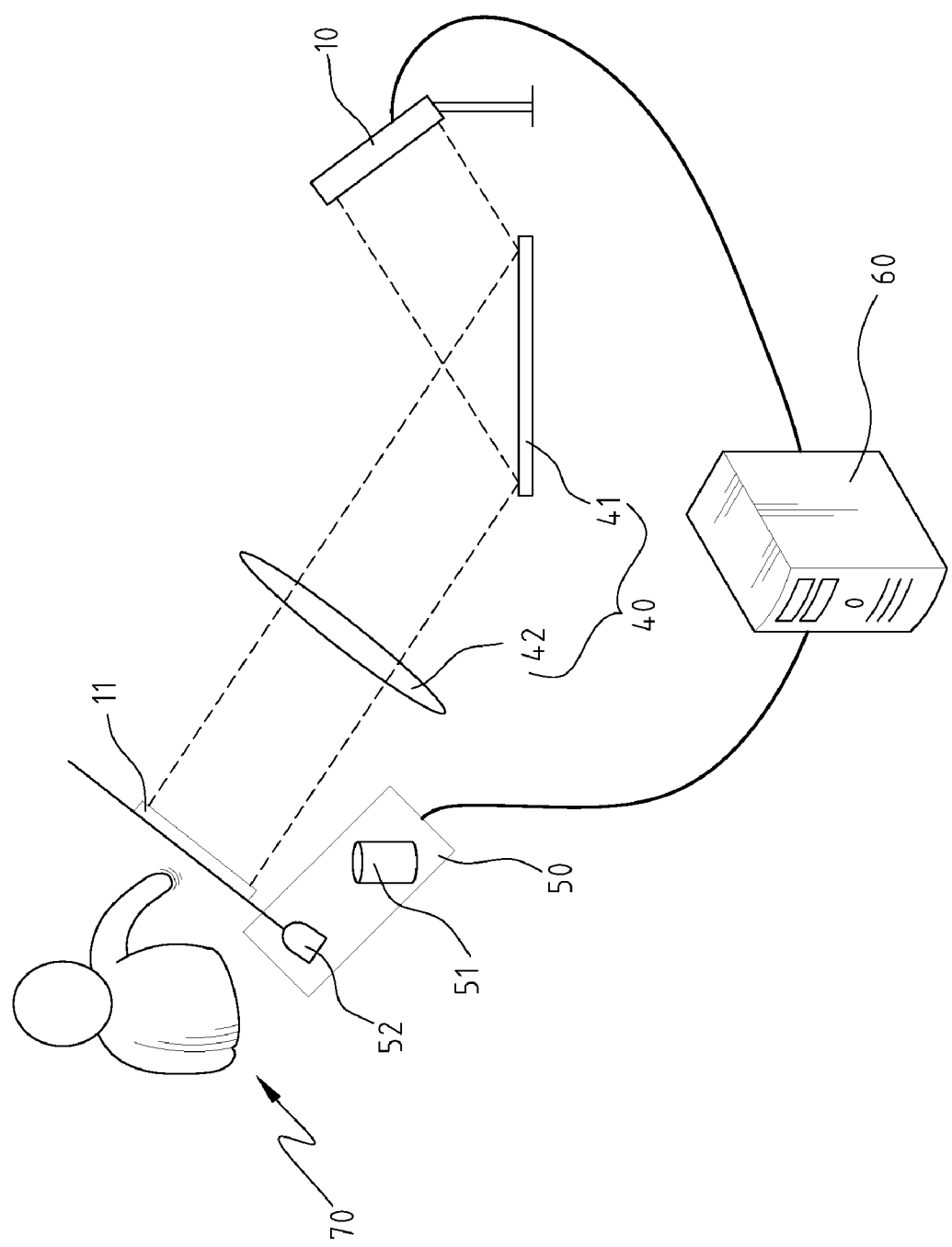
FIG. 4 is a first touch controlling embodiment illustrating a touch control virtual screen apparatus according to the present invention.

FIG. 4 is a first touch controlling embodiment illustrating a touch control virtual screen apparatus according to the present invention. Referring to FIG. 4, the touch control virtual screen apparatus includes a screen 10, an optical structure 40, and a detection module 50. The detection module 50 is adapted for detecting a motion of a hand of a user 70, so as to achieve a touch control on a virtual screen 11 image.

The screen 10 is connected to a host computer 60.

The optical structure 40 includes a reflective mirror 41 and an optical lens 42, and is adapted for displaying an image of a virtual screen corresponding to an image of the screen 10 in a space.

The detection module 50 includes a camera 51, a signal transceiver 52, and is connected to the host computer 60.

In operation, an image of the virtual screen 11 of the screen 10 is configured in the space by reflection of the reflective mirror 41 and transmittance via the optical lens 42. The signal transceiver 52 of the detection module 50 emits a linear signal. The linear signal is intercrossed in the space, thus configuring a signal plane, as shown in FIG. 4. According to the embodiment, the signal plane and the image of the virtual screen 11 are intensively overlapped, by properly adjusting the linear signal.

When a hand of the user 70 touches the virtual screen 11, the signal plane emitted by the signal transceiver 52 is synchronously received, so as to configure an apparent image reflection signal. The camera 51 detects and analyzes the image reflection signal to obtain a position where the finger of the user touches on the virtual screen 11, and a signal instruction thereof. The position and the signal instruction are then transmitted to the host computer 60 for processing. After being processed by the host computer 60, the position and the instruction signal corresponding to the virtual screen 11 are converted into a position and a signal instruction corresponding to the screen 10. In such a way, the user 70 can touch control the digital content displayed on the virtual screen 11, so as to practically operate the screen 10.

In the embodiment, the camera 51 of the detection module 50 for example is an infrared ray (IR) camera, and the signal transceiver 52 is an IR laser emitter.

Figure 5:
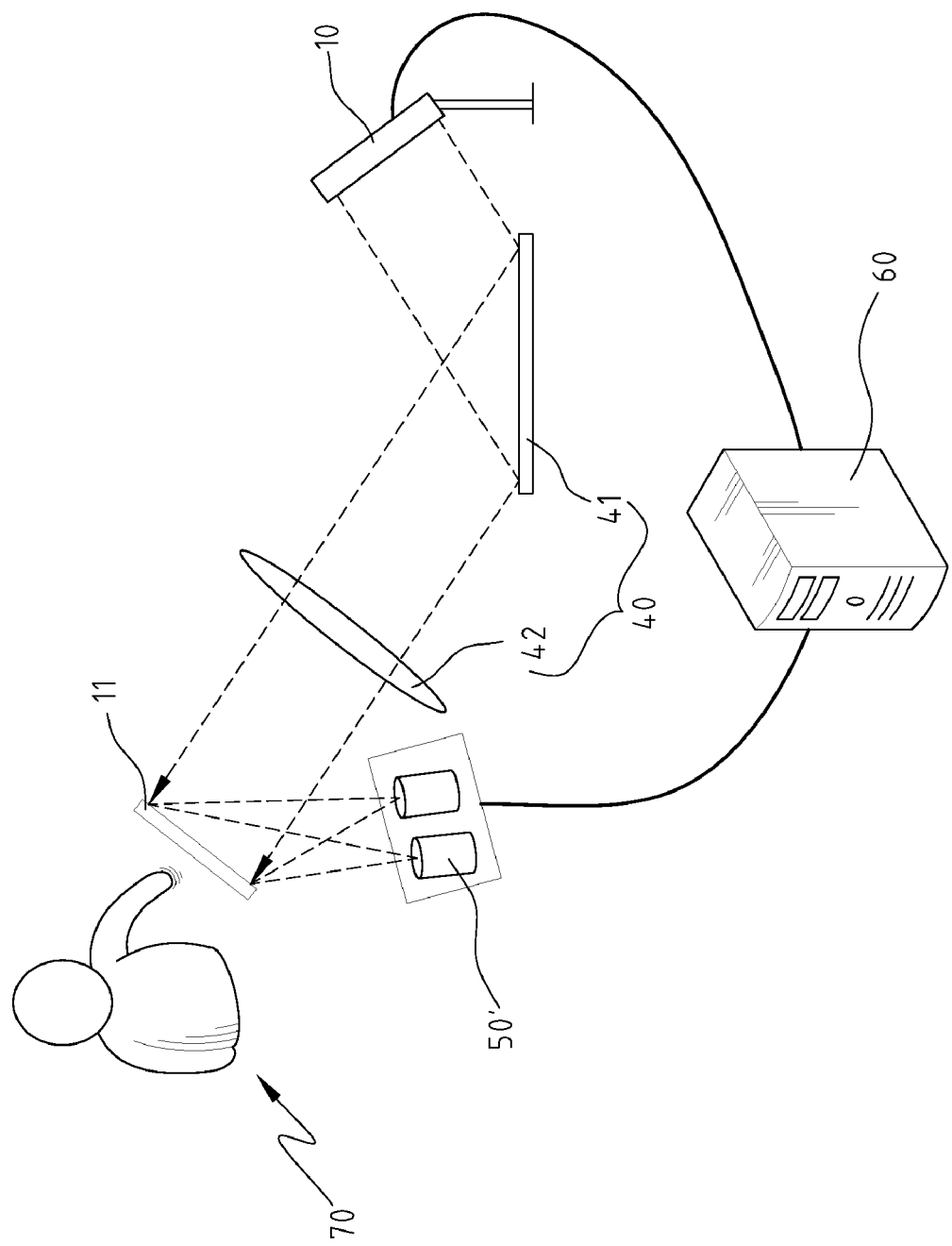
FIG. 5 is a second touch controlling embodiment illustrating a touch control virtual screen apparatus according to the present invention.

FIG. 5 is a second touch controlling embodiment illustrating a touch control virtual screen apparatus according to the present invention. Referring to FIG. 5, the second touch controlling embodiment of the present invention is similar with that of the first touch controlling embodiment as shown in FIG. 4, except the difference between the detection modules thereof.

In the second touch controlling embodiment of the present invention, the detection module 50' is a stereo camera connected to the host computer 60. The stereo camera is adapted for viewing or observing an action of the user. In this manner, the stereo camera observes and calculates a depth of each pixel point of the image of the virtual screen 11. As such, by observing the action of the user, the stereo camera determines a 3D spatial position of the finger by analyzing the observed data, and thus determining the exact position where the finger touches on the virtual screen 11, according to the 3D spatial position of the finger. Therefore, the detection module 50' transmits obtained signal to the host computer 60. The host computer 60 converts the position where the finger touches on the virtual screen 11 and a corresponding instruction into a position and an instruction corresponding to the screen 10.

Figure 6:
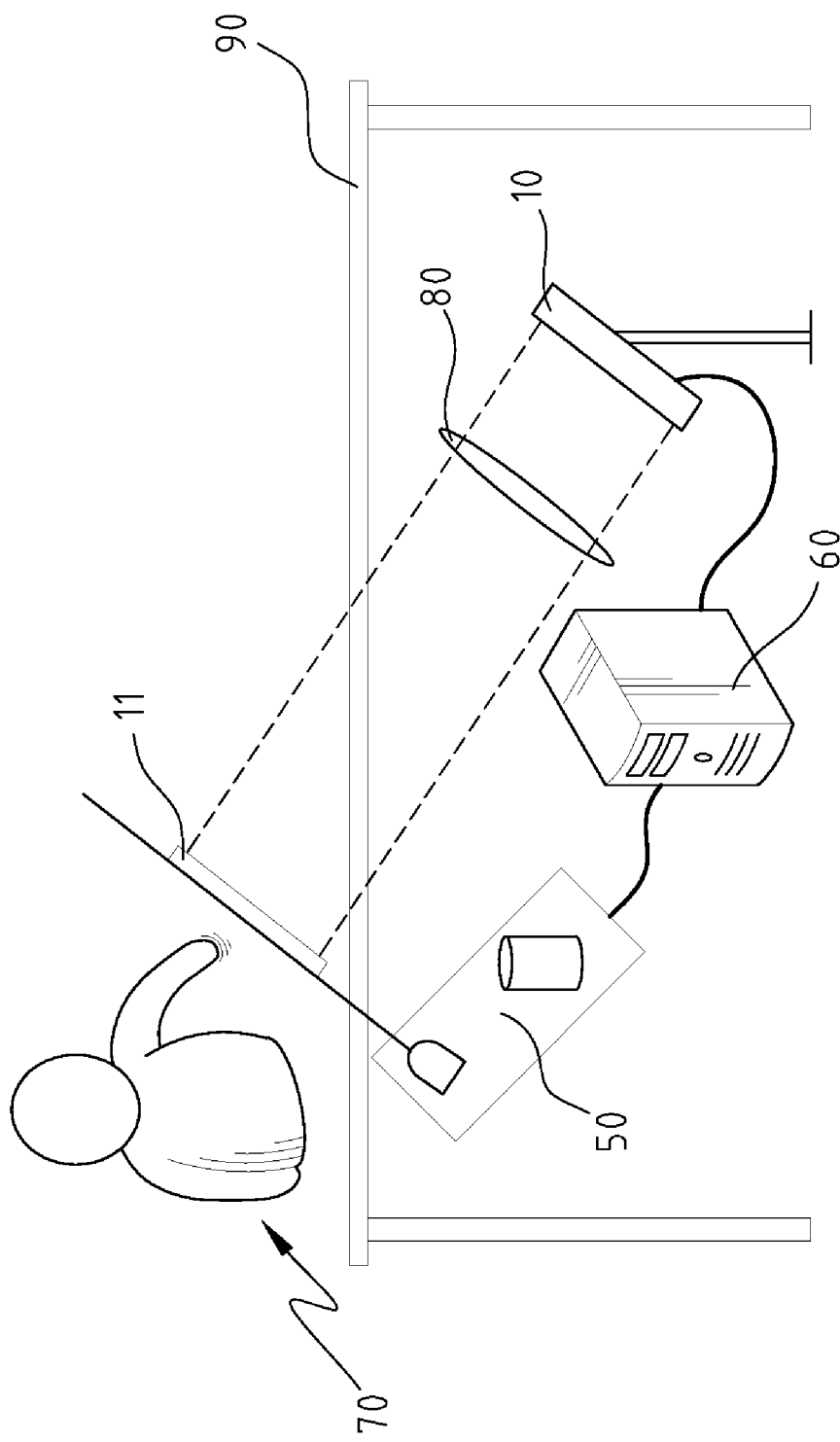
FIG. 6 is a third touch controlling embodiment illustrating a touch control virtual screen apparatus according to the present invention.

FIG. 6 is a third touch controlling embodiment illustrating a touch control virtual screen apparatus according to the present invention. Referring to FIG. 6, the structure and operation of the embodiment is substantially similar with the first touch controlling embodiment as shown in FIG. 4, and the second touch controlling embodiment as shown in FIG. 5. However, the third touch controlling embodiment of the present invention differs from the first touch controlling embodiment as shown in FIG. 4, and the second touch controlling embodiment as shown in FIG. 5, in that it assembles the screen 10, an optical structure 80, the detection module 50, and the host computer 60 under a desktop 90. The desktop 90 is light transparent. The embodiment is further different from the foregoing in that the optical structure 80 is an optical lens. The optical lens is adapted for imaging in a manner as shown in FIG. 1, in which an image of the screen 10 is refracted by the optical structure 80 to construct a virtual screen 11 across the transparent desktop. An image of the virtual screen 11 is then displayed in the 3D space over the desktop 90. Of course, the present invention can also be applied by employing the optical structure 40 of FIG. 4 in arriving similar performance of the optical structure 80.

According to the third touch controlling embodiment of the present invention as shown in FIG. 6, those substantive elements of the present invention can be hid beneath or inside the desktop 90 or other furniture, appliance. Generally speaking, those used to hide the substantive elements of the present invention should include a light transparent panel, such as a light transparent panel of a closet, a light transparent board of a compartment. In such a way, the present invention does not occupy external spaces, and is effective in space utilization.

In operation, the virtual screen 11 of the screen 10 can be displayed in a space over the desktop 90. Such a virtual screen 11 can be arbitrarily and inconspicuously operated.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A touch control virtual screen apparatus, comprising:
   at least a screen;
   at least an optical structure, configuring a virtual screen corresponding to the screen; and
   a detection module, for detecting and obtaining a signal generated corresponding to a position where the virtual screen is touched, and converting the signal into a corresponding position of the screen and a corresponding instruction thereof;
   wherein the optical structure is substantially configured with a hollow ellipsoid shape, wherein an inside surface of the hollow ellipsoid is a reflective surface, and the screen is accommodated in the hollow ellipsoid, wherein the hollow ellipsoid is configured with an opening, and is equipped with an optical lens assembled to the opening and corresponding to the screen, wherein after being reflected for two times at the inside reflective surface of the optical structure, an image of the screen configures a real image of the virtual screen across the optical lens.

2. The touch control virtual screen apparatus according to claim 1, wherein the screen is connected to a host computer; the detection module is connected to the host computer; and the host computer connects the screen and the detection module so as to transmit and convert the signal detected by the detection module into a corresponding position of the screen and a corresponding instruction thereof.

3. The touch control virtual screen apparatus according to claim 1, wherein the optical lens of the optical structure refracts the image of the screen to display the image on the virtual screen in 3D space.

4. The touch control virtual screen apparatus according to claim 1, wherein the optical lens is a Fresnel lens.

5. The touch control virtual screen apparatus according to claim 1, wherein the screen is a liquid crystal screen.

6. The touch control virtual screen apparatus according to claim 1, wherein the screen is adapted to emit a light.

7. The touch control virtual screen apparatus according to claim 1, wherein an end of the hollow ellipsoid of the optical structure is removed away from one side and configured to be a flat plane which does not reflect the screen.

8. The touch control virtual screen apparatus according to claim 7, wherein the flat plane of the optical structure is a non-light-reflective plane.

9. The touch control virtual screen apparatus according to claim 1, wherein the detection module is a stereo camera, for observing an action of a finger of a user.

10. The touch control virtual screen apparatus according to claim 9, wherein the stereo camera is adapted for observing and calculating a depth of each pixel point of the image of the virtual screen, and determining a 3D spatial position of the finger by analyzing observed data, and thus determining the position where the finger touches on the virtual screen.

11. The touch control virtual screen apparatus according to claim 9, wherein the stereo camera is connected to a host computer, and the host computer converts the position where the finger touches on the virtual screen and a corresponding instruction into a position and an instruction corresponding to the screen.

12. The touch control virtual screen apparatus according to claim 1, wherein the screen, the optical structure, and the detection module are hid and assembled inside, under or behind a substantive member having a light transparent panel.

13. The touch control virtual screen apparatus according to claim 12, wherein the substantive member is a desk having a light transparent desktop.

14. The touch control virtual screen apparatus according to claim 12, wherein the substantive member is a closet having a light transparent board.

15. The touch control virtual screen apparatus according to claim 12, wherein the substantive member is a compartment having a light transparent board.

* * * * *